(12) United States Patent
O'Neill

(10) Patent No.: US 7,443,520 B2
(45) Date of Patent: Oct. 28, 2008

(54) IMAGING DEVICE CONFIGURATION PAGES

(75) Inventor: Kevin O'Neill, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 971 days.

(21) Appl. No.: 10/837,962

(22) Filed: May 3, 2004

(65) Prior Publication Data

US 2005/0243354 A1     Nov. 3, 2005

(51) Int. Cl.
G06F 3/12     (2006.01)
(52) U.S. Cl. .............. 358/1.13; 713/190; 717/168; 382/317; 235/487
(58) Field of Classification Search ....... 358/1.13–1.16; 700/90; 713/200–201; 702/188
See application file for complete search history.

(56) References Cited

U.S. PATENT DOCUMENTS

| | | | |
|---|---|---|---|
| 6,041,183 A | 3/2000 | Hayafune et al. | |
| 6,467,087 B1 | 10/2002 | Yang | |
| 6,535,298 B2 * | 3/2003 | Winter et al. | 358/1.16 |
| 6,618,162 B1 | 9/2003 | Wiklof et al. | |
| 6,983,375 B2 * | 1/2006 | Zhang et al. | 726/35 |
| 6,990,434 B2 * | 1/2006 | Minogue et al. | 702/188 |
| 7,079,275 B2 * | 7/2006 | Henry et al. | 358/1.15 |
| 2002/0043173 A1 | 4/2002 | Horii et al. | |
| 2003/0035139 A1 | 2/2003 | Tomita et al. | |
| 2003/0050835 A1 | 3/2003 | Johnson et al. | |
| 2003/0086106 A1 | 5/2003 | Parry | |
| 2003/0128991 A1 | 7/2003 | Carling et al. | |
| 2003/0187922 A1 | 10/2003 | Ohara | |
| 2003/0193684 A1 | 10/2003 | Kendall et al. | |
| 2004/0251305 A1 * | 12/2004 | Klapka et al. | 235/383 |
| 2005/0107898 A1 * | 5/2005 | Gannon et al. | 700/90 |

FOREIGN PATENT DOCUMENTS

| | | |
|---|---|---|
| JP | 2000316066 | 11/2000 |
| JP | 2002063098 | 2/2002 |
| JP | 2002132368 | 5/2002 |

\* cited by examiner

Primary Examiner—Mark K Zimmerman
Assistant Examiner—Dung D Tran

(57) ABSTRACT

Configuration pages for imaging devices and methods are provided. A configuration page for an imaging device has a media sheet having hardcopy images printed thereon by the imaging device. The hardcopy images include one or more dormant options imbedded in the imaging device.

16 Claims, 7 Drawing Sheets

IMAGING DEVICE CONFIGURATION PAGES

BACKGROUND

Many imaging devices, such as printers, multifunction peripherals (MFPs), etc., include embedded upgrade options that lay dormant within the imaging device until the customer pays for them or needs them. Such options include faster print speeds, higher quality printing, duplex printing, etc. The idea is that the options remain dormant within the printer until activated. In some cases, a separate version of printer firmware is needed to activate each of the options. The problem with this is that it can be difficult to keep up with several versions of firmware.

SUMMARY

One embodiment of the present invention provides a configuration page for an imaging device that has a media sheet having hardcopy images printed thereon by the imaging device. The hardcopy images include one or more dormant options imbedded in the imaging device.

Further embodiments of the invention include methods and apparatus of varying scope.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1A:
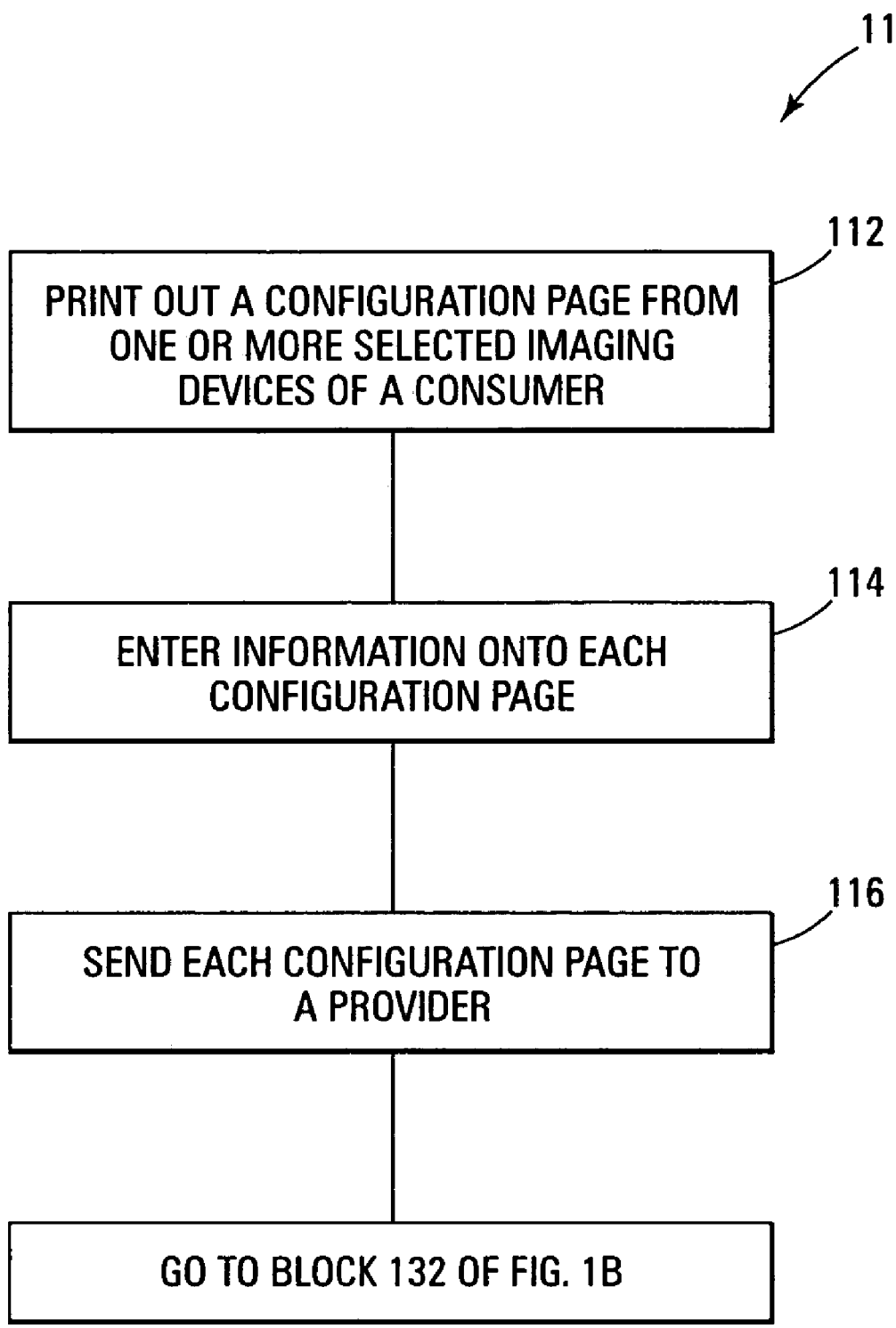
FIGS. 1A-1C present a flowchart of a method for activating dormant options in imaging devices, according to an embodiment of the present invention.
Figure 1B:
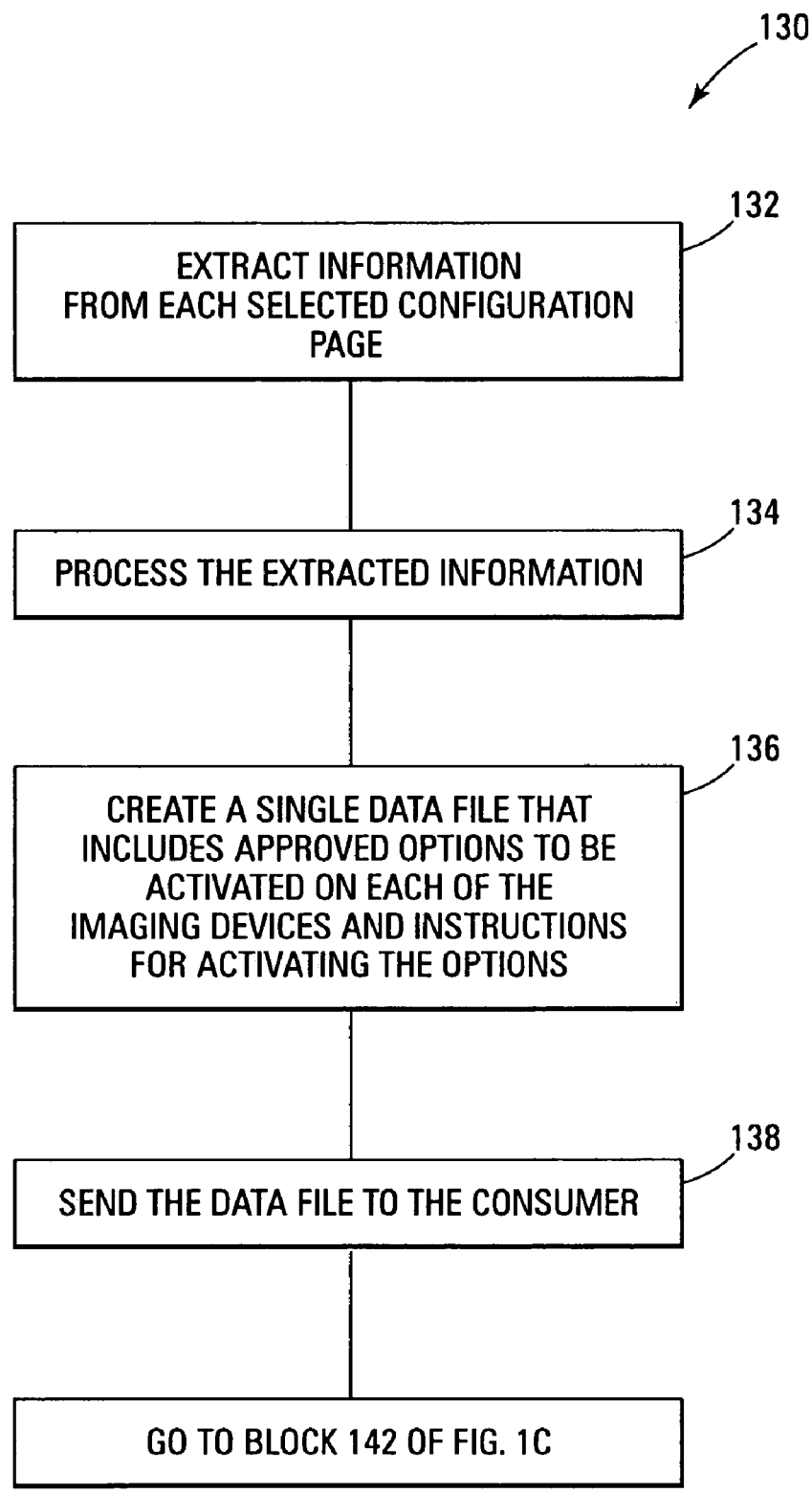
Figure 1C:
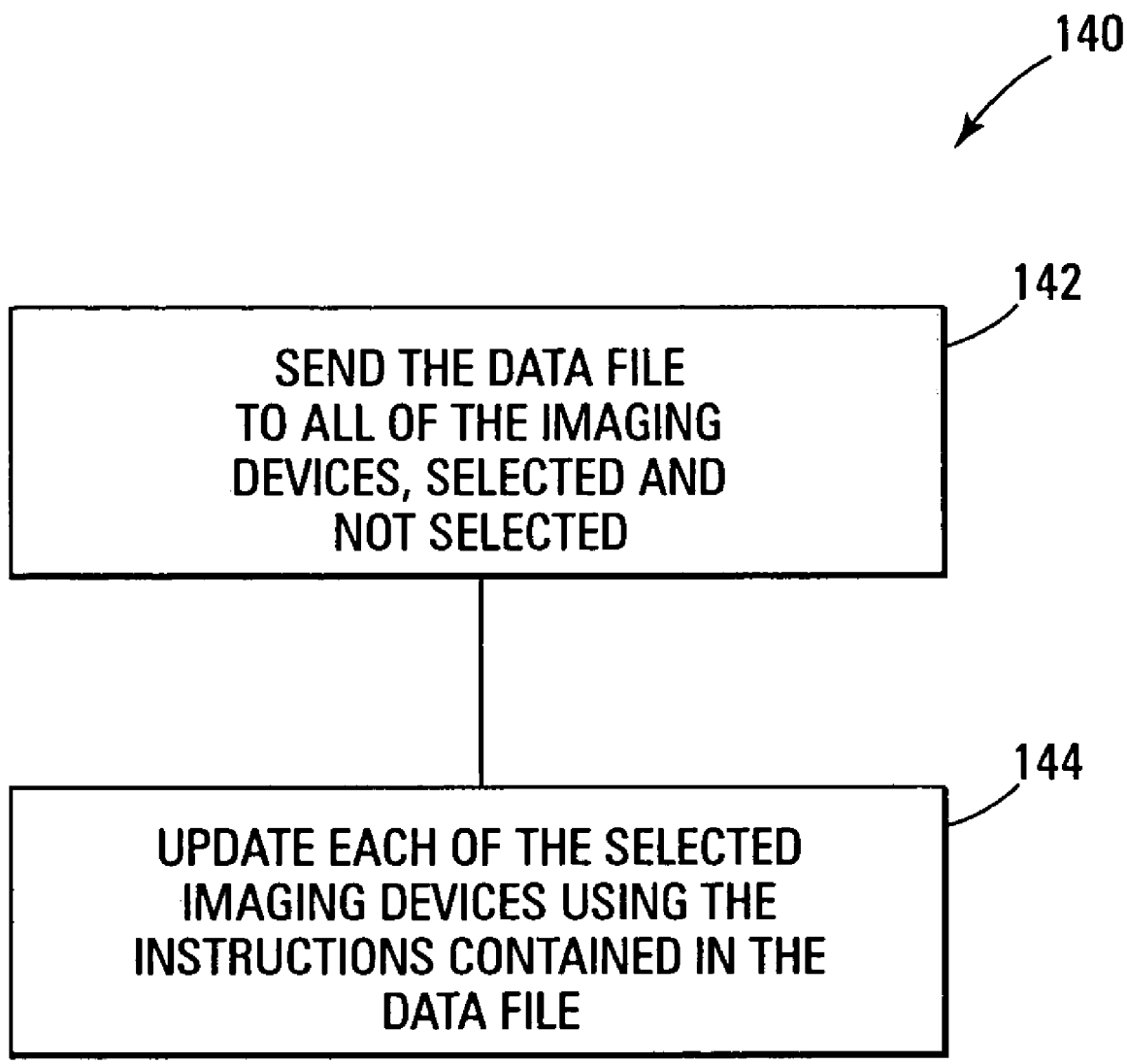

FIGS. 1A to 1C present a flowchart of a method for activating dormant options in one or more selected imaging devices, such as printers, multifunction peripherals (MFPs), etc., according to an embodiment of the present invention. Dormant options may include various print speeds, varying print qualities, duplex printing, etc. The method includes a method 110 of FIG. 1A and a method 140 of FIG. 1C. A user of the imaging device performs methods 110 and 140, e.g., at a consumer's site(s). Method 100 also includes a method 130 of FIG. 1B performed by a provider, such as the manufacturer, of the imaging device, for example, at the provider's site. The term user as used herein refers to any user of an imaging device at the consumer's site(s) and includes representatives of the consumer, such as a system administrator, and representatives of the provider, such as a service representative.

Figure 2:
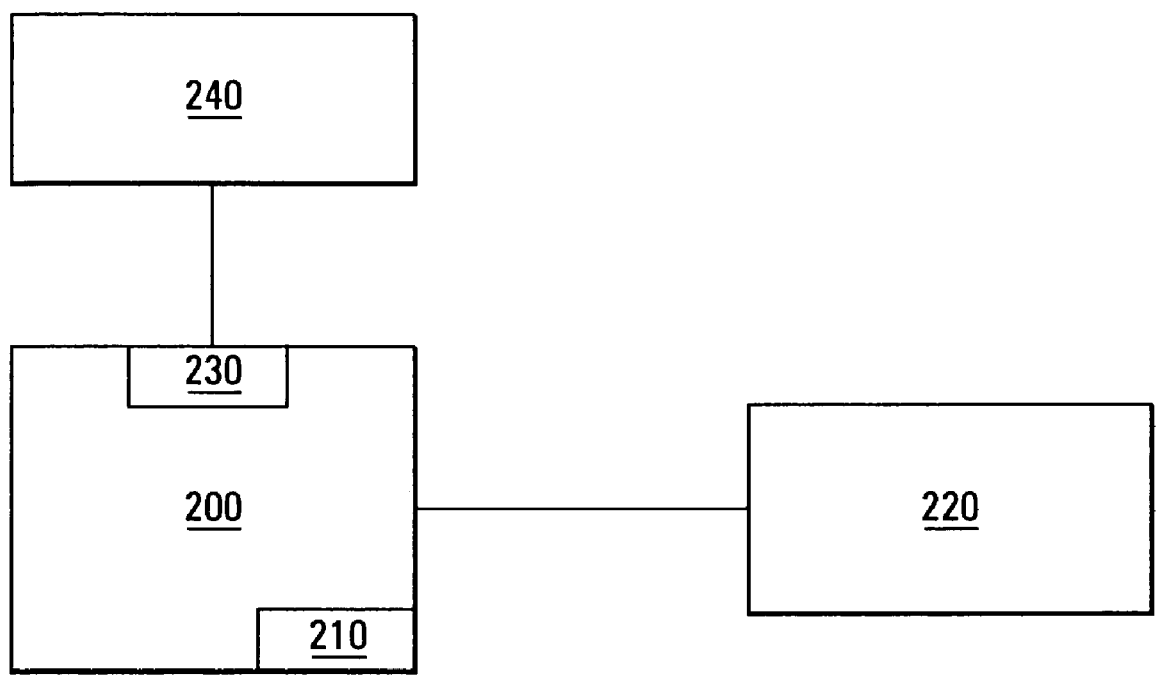
FIG. 2 illustrates a computer setup for performing various methods, according to another embodiment of the present invention.

For one embodiment, a computer 200, such as a personal computer, shown in FIG. 2, performs method 130 in response to computer-readable instructions. The computer-readable instructions are contained on a computer-usable storage media 210 of computer 200, such as the hard drive of computer 200 or a compact disc read-only memory (CD-ROM), flash memory cards (e.g., CompactFlash available from SanDisk Corporation, Sunnyvale, Calif., USA, and Memory Stick available from Sony Corporation, Japan), floppy disks, Universal Serial Bus (USB) drives, etc. For another embodiment, computer 200 is connected to a server 220, e.g., over a local area network (LAN), intranet, etc., as shown in FIG. 2. Computer 200 also has a fax/modem 230 connected to a data network 240, such as the Internet.

Figure 3:
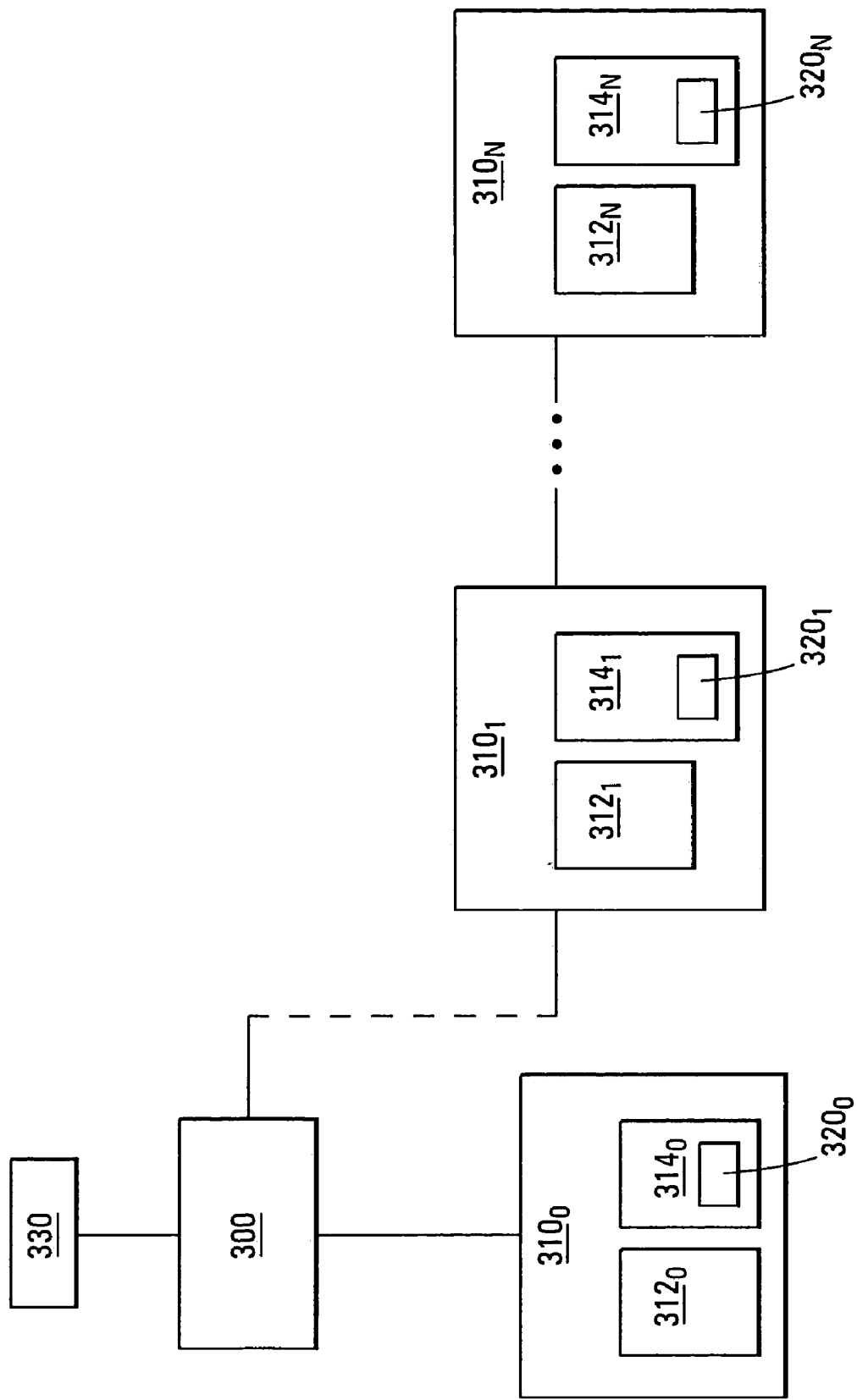
FIG. 3 illustrates a network of imaging devices, according to another embodiment of the present invention.

The consumer has a computer 300 connected directly to an imaging device $310_0$ or to imaging devices $310_1$ to $310_N$ via a local area network (LAN), for example, as shown in FIG. 3. Imaging devices 310 may be a printer, MFP, or the like. Imaging devices may be housed at a single site of the consumer or multiple sites of the consumer. Computer 300 is connected to a data network 330, such as the Internet. Each of imaging devices 310 has a print engine 312 and a formatter 314, as shown in FIG. 3. Each formatter has computer-usable storage media 320 containing computer readable-instructions for causing the respective printer to perform various operations. In some embodiments, computer-usable storage media 320 includes a hard drive or other computer-usable storage media that can be fixedly or removably attached to the respective imaging device 310, e.g., magnetic media, optical media, read only memory (ROM), electrically erasable programmable read only memory (EEPROM), or other non-volatile storage media.

Figure 4:
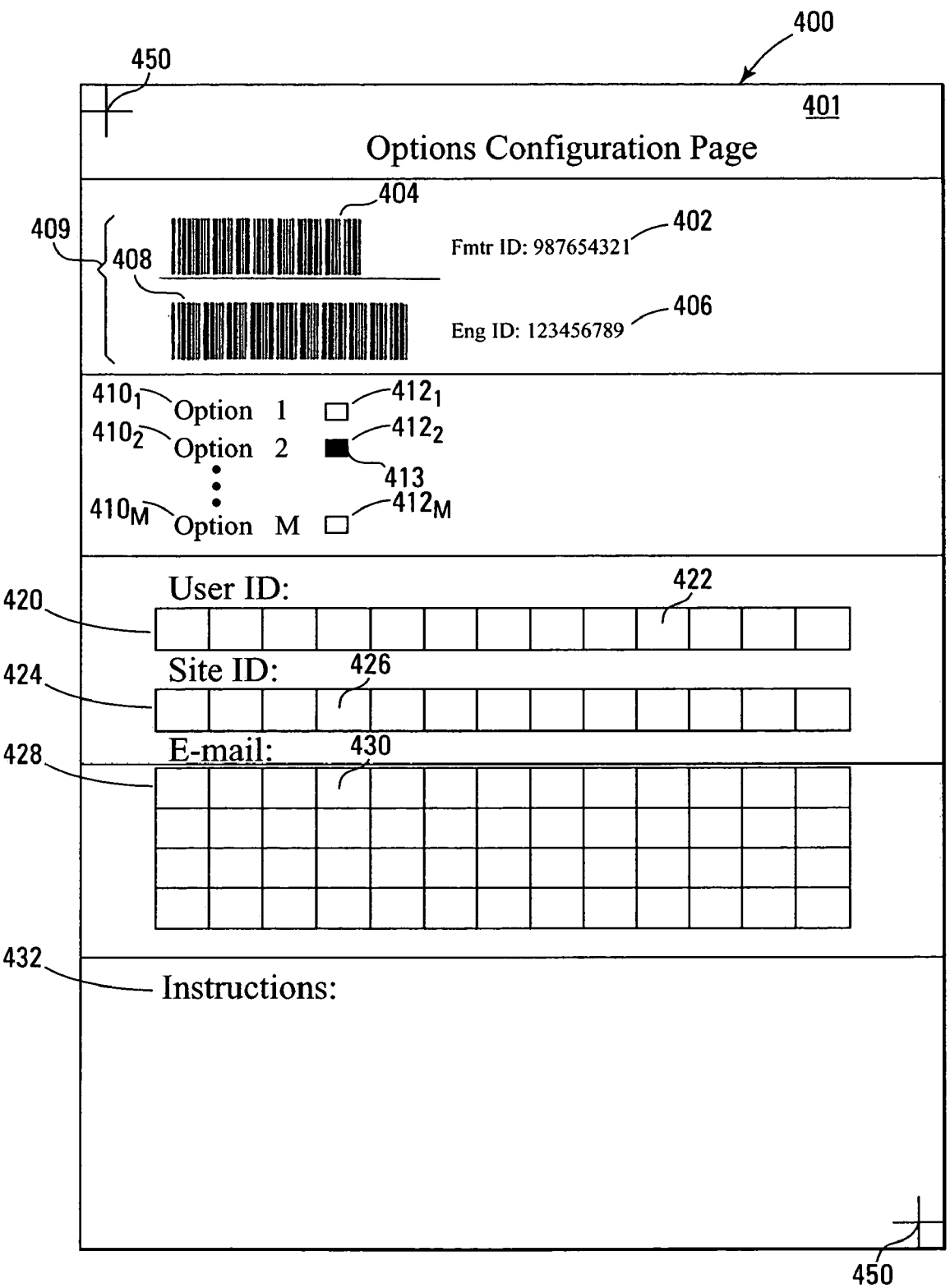
FIG. 4 illustrates a configuration page, according to another embodiment of the present invention.

At block 112 of method 110 of FIG. 1A, an options configuration page, such as an options configuration page 400 of FIG. 4, according to another embodiment of the present invention, is printed from one or more of imaging devices 310 of FIG. 3 selected for modification. For example, an individual options configuration page is printed from imaging device $310_0$, and another individual configuration page is printed from imaging device $310_1$. The configuration page may be printed in response to a receiving a command from computer 300 at the respective imaging device or in response to selecting an option from a menu on the respective imaging device.

Configuration page 400 includes a media sheet 401, e.g., a paper sheet, that includes hardcopy images printed thereon by the respective imaging device 310. One hardcopy image corresponds to a formatter identifier 402 that may be all numeric, as shown in FIG. 4, alphanumeric, or all letters and/or encoded into a barcode 404 or other machine-readable indicia. Formatter identifier 402 corresponds to the formatter 314 of the imaging device that printed out the options configuration page 400, such as formatter $314_0$ of imaging device $310_0$ or formatter $314_1$ of imaging device $310_1$ for the present example.

Another hardcopy image corresponds to a print engine identifier 406 that may be all numeric, as shown in FIG. 4, alphanumeric, or all letters and/or encoded into a barcode 408 or other machine-readable indicia. Print engine identifier 406 corresponds to the print engine 312 of the imaging device that printed out the options configuration page 400, such as print engine $312_0$ of imaging device $310_0$ or print engine $312_1$ of imaging device $310_1$ for the present example. A formatter/ print-engine identifier 409 that includes a format identifier 402 and a print engine identifier 406 in combination uniquely specifies an imaging device 310.

Configuration page 400 also includes hardcopy images printed thereon that correspond to options 410. Options 410 correspond to dormant options embedded in the formatter of the imaging device that printed configuration page 400. Dormant options may include various print speeds, varying print qualities, duplex printing, postscript, Portable Document Format (PDF) support, etc. For another embodiment, open symbols 412, e.g., circles, ellipses, boxes, etc., are printed as hardcopy images adjacent options 410. To select an option, the user makes a mark adjacent the option, e.g., by placing the mark within the symbol 412 corresponding to the option. For example, to select option $410_2$, the user places a mark 413 within symbol $412_2$, as shown in FIG. 4.

Configuration page 400 may include a region 420 designated for receiving a user identifier as a handwritten, typed, or printed user input, for example. For one embodiment, the region 420 includes open symbols 422, printed as hardcopy images on the configuration sheet, in which the user identifier can be entered.

Configuration page 400 may further include a region 424 designated for receiving a site identifier as a handwritten, typed, or printed user input, for example. For one embodiment, the region 424 includes open symbols 426, printed as hardcopy images on the configuration sheet, in which the consumer's site identifier can be entered. Note that the site identifier identifies a consumer's site that houses the imaging device that printed the configuration page.

For one embodiment, configuration page 400 includes a region 428 designated for receiving an email address of the computer 300 of FIG. 3 as a handwritten, typed, or printed user input, for example. For one embodiment, the region 428 includes open symbols 430, printed as hardcopy images on the configuration sheet, in which the email address can be entered.

Configuration page 400 may also include instructions 432 for handling configuration page 400. For example, the instructions may include an address of a location for receiving the configuration page, such as a fax number of the provider to which the configuration page is to be faxed for activating options 410 to modify operation of the imaging device that printed the configuration page.

At block 114 of method 110 of FIG. 1A, the user enters information onto each configuration page, as described above for configuration page 400 of FIG. 4. Method 110 then proceeds to block 116, where a separate configuration page printed from each of selected imaging devices 310 and containing user-entered information is sent to the provider, i.e., to computer 200, by faxing, for example.

When computer 200 receives data corresponding to a configuration page 400 for each of the selected imaging devices 310 of FIG. 3, computer 200 creates an electronic representation (or bitmap) of each configuration page (hereinafter to be referred to as an electronic configuration page). At block 132 of method 130 of FIG. 1B, computer 200 extracts the information from each electronic configuration page. For one embodiment, scanning the electronic configuration page and using optical character recognition methods accomplishes this. If any of the information, such as handwritten information, cannot be interpreted, computer 200 displays an error message that informs an operator of computer 200 to intervene. Operator intervention may include the operator examining the electronic configuration page and keying in the information corresponding to the information that could not be interpreted.

For one embodiment, one or more reference marks 450 are printed on configuration sheet 400 as hardcopy images for enabling computer 200 to locate the information on the electronic configuration page. For example, computer 200 may include location information for locating the options, formatter identifier, print engine identifier, etc. based on distances from a reference mark 450.

Figure 5:
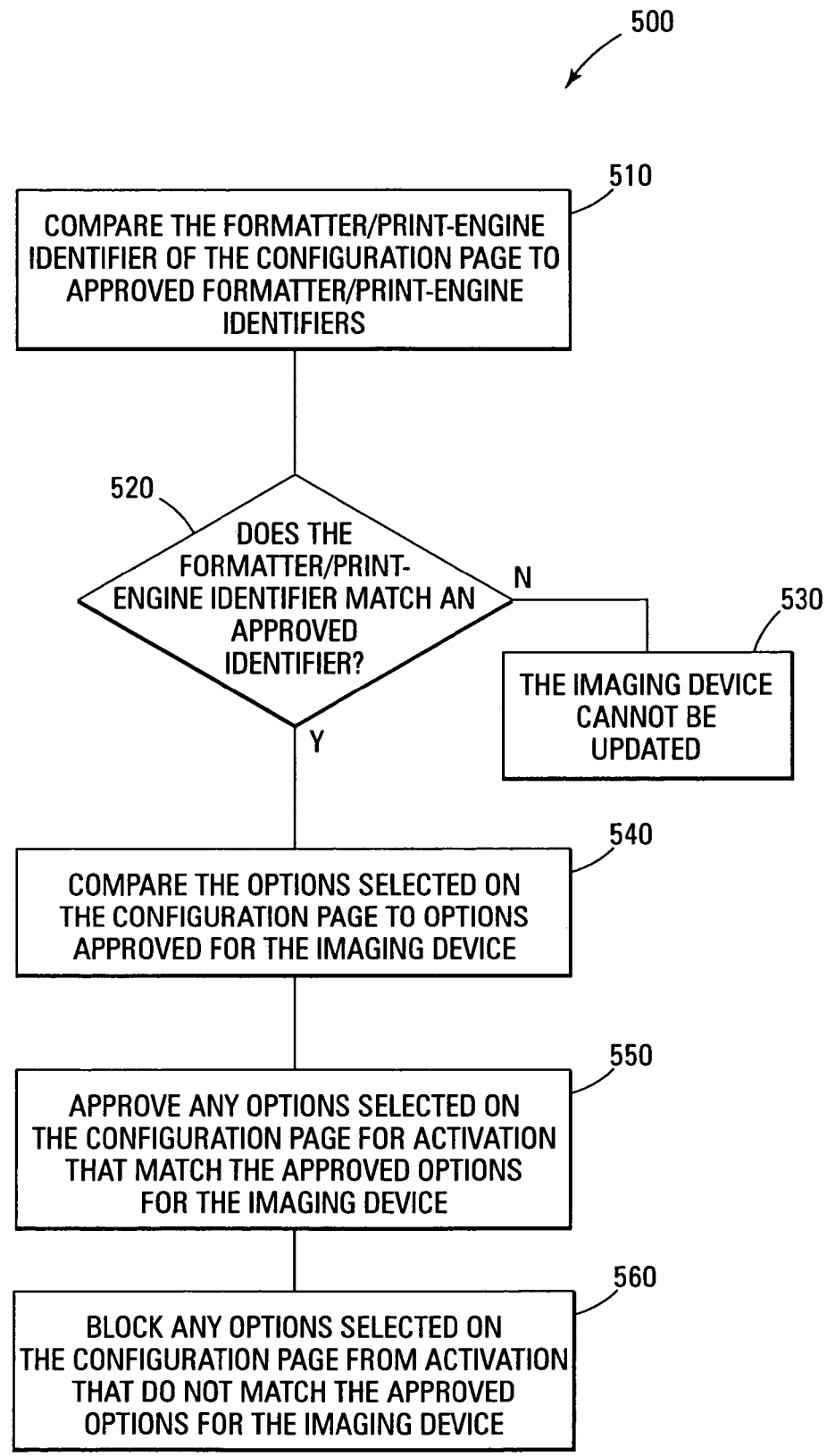
FIG. 5 presents a flowchart of a method for processing a configuration page, according to another embodiment of the present invention.

At block 134 of method 130 of FIG. 1B, the extracted information for each configuration page is processed. FIG. 5 is a flowchart of a method 500 for processing a configuration page, according to another embodiment of the present invention. At block 510, data corresponding to the formatter/print-engine identifier of the configuration page for the imaging device that printed the configuration page, such as the formatter/print-engine identifier 409, described above in conjunction with FIG. 4, is compared to data corresponding to approved formatter/print-engine identifiers contained in a data base contained on computer-usable storage media 210 (FIG. 2) of computer 200 or server 220. Recall that a formatter/print-engine identifier uniquely specifies an imaging device. If the formatter/print-engine identifier of a configuration page does not match any of the formatter/print-engine identifiers in the database at decision block 520, computer 200 indicates that the imaging device that printed that configuration page cannot be updated at block 530.

If the formatter/print-engine identifier of a configuration page does match one of the formatter/print-engine identifiers in the database at decision block 520, the imaging device that printed that configuration page can be updated and the method proceeds to block 540. At block 540, data corresponding to each of the options selected on the configuration page is compared to data corresponding to options, contained in the database, that are approved for the imaging device that printed the configuration page, e.g., where the imaging device is specified by its approved formatter/print-engine identifier. Any of the options selected on the configuration page that match the approved options in the database are approved for activation at block 550. Any of the options selected on the configuration page that do not match the approved options are blocked from activation at block 560. When none of the options selected on the configuration page match the approved options, computer 200 indicates that the imaging device that printed the configuration page cannot be updated. Method 500 is repeated for each configuration page received at computer 200.

For various embodiments, approved combined formatter/print-engine identifiers correspond to imaging devices provided by the provider. Moreover, approved options correspond to options that have been pre-purchased, for example, by the consumer.

At block 136 of method 130 of FIG. 1B, a single data file is created that includes data corresponding to the options approved for activation for each of the imaging devices approved for updating. For one embodiment, the single data file respectively associates the formatter/print-engine identifier of each of the approved imaging devices with the approved options for each of approved imaging devices. The single data file also includes instructions for activating the approved options on each of the imaging devices. For another embodiment, this information is encrypted. The single data file is sent to the consumer (or computer 300) at block 138, e.g., by email. For another embodiment, the email includes instructions on how to update the selected imaging devices using the single data file. For another embodiment, computer 200 extracts an email address of the consumer provided on the configuration sheet.

At block 142 of FIG. 1C, computer 300 of FIG. 3 sends the single data file to all of the imaging devices 310, selected and not selected, connected thereto. Upon receiving the data file, the formatters 314 of the respective imaging devices query the data file for its formatter/print-engine identifier. When a selected imaging device finds its combined formatter/print-engine identifier, it is approved for updating. At block 144, the single data file updates the selected imaging device, approved for updating, using the instructions contained in the data file to activate the options selected for that imaging device. For embodiments where the data file is encrypted, the formatter of the imaging device decrypts the instructions for activating the options. When a selected imaging device does not find its combined formatter/print-engine identifier it is not approved, and that imaging device is not updated. When a non-selected imaging device does not find its combined formatter/print-engine identifier that imaging device is not updated.

CONCLUSION

Although specific embodiments have been illustrated and described herein it is manifestly intended that this invention be limited only by the following claims and equivalents thereof.

What is claimed is:

1. A method of selecting dormant options of an imaging device for activation, comprising:
   printing hardcopy images corresponding to dormant options imbedded in the imaging device on a media sheet using the imaging device;
   printing a formatter identifier on the media sheet that identifies a formatter of the imaging device, using the imaging device;
   printing a print-engine identifier on the media sheet that identifies a print engine of the imaging device, using the imaging device;
   placing a mark adjacent one or more of the hardcopy images corresponding to the dormant options to mark the one or more dormant options;
   sending the media sheet to provider of the imaging device after marking the one or more dormant options;
   comparing the formatter identifier to approved formatter identifiers at the provider;
   comparing the print-engine identifier to approved print-engine identifiers at the provider:
   when the formatter identifier matches an approved formatter identifier and the print-engine identifier matches an approved print-engine identitier, determining, at the provider, which of the marked one or more dormant options is approved;
   sending one or more approved dormant options corresponding to the marked one or more dormant options that are approved to the imaging device; and
   activating the one or more approved dormant options at the imaging device.

2. A method of selecting dormant options for activation on a plurality of imaging devices comprising:
   printing a configuration page at each of the plurality of imaging devices, each configuration page comprising hardcopy images corresponding to dormant options imbedded in the imaging device that printed the respective configuration page, hardcopy images identifying a formatter of that imaging device, and hardcopy images identifying a print-engine of that imaging device;
   placing a mark adjacent one more of the hardcopy images corresponding to dormant options of each configuration page to mark the one or more dormant options of each configuration page; and
   sending each configuration page to a provider of the imaging device that printed the respective configuration page;
   determining, at the provider, which of the marked one or more dormant options on each of the configuration pages is approved only when the hardcopy images identifying the formatter of that imagine device matches formatter-identifier data in a database of the provider of that imaging device and the hardcopy images identifying the print engine of that imaging device matches print-engine-identifier data in the database;
   sending one or more approved dormant options corresponding to the marked one or more dormant options on each of the configuration pages that are approved for each of the plurality of imaging devices to each of the plurality of imaging devices; and
   activating the one or more approved dormant options at each of the plurality of imaging devices.

3. The method of claim 2, wherein sending each configuration page to a provider of the imaging device comprises faxing each configuration page to a fax number printed on each of the configuration pages.

4. A computer-usable medium containing computer-readable instructions for causing an imaging device to perform a method, comprising:
   printing one or more hardcopy images corresponding to one or more dormant options imbedded in the imaging device on a media sheet using the imaging device, wherein the one or more dormant options are selected by forming a mark adjacent the one or more hardcopy images corresponding to the one or more dormant options;
   printing a formatter identifier on the media sheet that identifies a formatter of the imaging device using the imaging device;
   printing a print-engine identifier on the media sheet that identifies a print engine of the imaging device using the imaging device;
   sending a data file containing approved dormant options to a plurality of imaging devices that are selected and not selected;
   receiving one or more approved dormant options corresponding to selected one or more dormant options on the media sheet that are approved at a provider of the imaging device from the provider, wherein the one or more dormant options are approved at the provider only when the formatter identifier matches formatter-identifier data in a database of the provider and when the print-engine identifier data in the database; and
   activating the received one or more approved dormant options at the imaging device.

5. The computer-usable medium of claim 4, wherein the method further comprises printing one or more hardcopy images on the media sheet corresponding to one or more open symbols that are respectively adjacent the one or more dormant options, each of the open symbols for receiving the mark for selecting an adjacent one of the one or more dormant options.

6. The computer-usable medium of claim 4, wherein the method further comprises at least one of printing hardcopy images on the media sheet that designate a region for receiving a user identifier, printing hardcopy images on the media sheet that designate a region for receiving a site identifier, and printing hardcopy images on the media sheet that designate a region for receiving an email address.

7. A computer-usable medium containing computer-readable instructions for causing a computer to perform a method, comprising:
converting data corresponding to a plurality of media sheets to a plurality of corresponding electronic versions of the media sheets;
extracting data from each of the electronic versions of the media sheets corresponding to one or more dormant options respectively imbedded in each of a plurality imaging devices, the one or more dormant options printed as hardcopy images on each of the media sheets by a respective one of the plurality imaging devices and selected by user marks disposed on each of the printed media sheets;
determining whether the one or more dormant options of each of the media sheets is approved; and p1 creating a single data file that contains one or more approved dormant options for a respective one of each of the imaging devices having one or more approved dormant options and instructions for activating the one or more approved dormant options for the respective one of each of the imaging devices having one or more approved dormant options, the single data file containing a formatter identifier associated with the one or more approved dormant options for the respective one of each of the imaging devices having one or more approved dormant options that identifies a formatter of the respective one of each of the imaging devices having one or more approved dormant options, and the single data file containing a print-engine identifier associated with the one or more approved dormant options for the respective one of each of the imaging devices having one or more approved dormant options that identifies a print engine of the respective one of each of the imaging devices having one or more approved dormant options.

8. The computer-usable medium of claim 7, wherein the method further comprises sending the data file to a computer connected to each of the imaging devices.

9. The computer-usable medium of claim 7, wherein the method further comprises encrypting the instructions.

10. The computer-usable medium of claim 7, wherein the method further comprises:
extracting an email address from at least one of the electronic versions of the media sheets that was entered on the corresponding media sheet by a user after the corresponding media sheet was printed; and
sending the single data file to the email address.

11. A computer-usable medium containing computer-readable instructions for causing a computer to perform a method, comprising:
comparing first data that corresponds to an identifier that identifies a formatter of an imaging device printed on a media sheet by the imaging device to data corresponding to approved formatter identifiers;
comparing second data that corresponds to an identifier that identifies a print-engine of the imaging device printed on a media sheet by the imaging device to data corresponding to approved print-engine identifiers;
when the first data matches the data corresponding to one of the approved formatter identifiers and when the second data matches the data corresponding to one of the approved print-engine identifiers, third data corresponding to at least one option printed on the media sheet by the imaging device and selected by a user mark disposed on the printed media sheet to data corresponding to approved options, wherein the at least one option printed on the media sheet is a dormant option of the imaging device and the approved options are options of the imaging device approved for activation;
when the third data matches data corresponding to one of the approved options, creating a data file that contains the first, second, and third data and instructions for activating the at least one option printed on the media sheet and selected by the user mark; and
sending the data file to a computer connected to the imaging device.

12. The computer-usable medium of claim 11, wherein the method further comprises when the first data does not match the data corresponding to any of the approved formatter identifiers and when the second data does not match the data corresponding to any of the appproved print-engine identifiers, indicating that the imaging device cannot be updated.

13. The computer-usable medium of claim 11, wherein the method further comprises when the second data does not match the data corresponding to any of the approved options, indicating that the imaging device cannot be updated.

14. A method of activating dormant options in a plurality selected imaging devices, comprising:
printing a configuration sheet from each of the selected imaging devices, the configuration sheet from each of the plurality of selected imaging devices comprising a formatter identifier and a print-engine identifier;
placing a mark adjacent one or more hardcopy images on each configuration sheet respectively corresponding to one or more dormant options of a respective one of the imaging devices;
sending each of the marked configuration sheets to a provider of the imaging devices;
determining, at the provider, whether the marked one or more dormant options on each of the configuration sheets is approved;
creating a single data file at the provider that contains one or more approved dormant options for each of the selected imaging devices having one or more approved dormant options and instructions for activating the one or more approved dormant options for each of the selected imaging devices, having one or more approved dormant options;
sending the single data file to each of the plurality of selected imaging devices, regardless of whether a selected imaging device has one or more approved dormant options; and
activating the one or more approved dormant options at each of the plurality of selected imaging devices having one or more approved dormant options.

15. The method of claim 14, wherein sending each of the marked configuration sheets to the provider comprises faxing each of the marked configuration sheets to the provider.

16. The method of claim 14, wherein sending the single data file to a each of the selected imaging devices, regardless of whether a selected imaging device has one or more approved dormant options futher comprises;
emailing the single data file to a computer connected to each of selected the imaging devices, regardless of whether a selected imaging device has one or more dormant options; and
sending the single data file from the computer to each of selected the imaging devices, regardless of whether a selected imaging device has one or more approved dormant options.

* * * * *

UNITED STATES PATENT AND TRADEMARK OFFICE
CERTIFICATE OF CORRECTION

PATENT NO. : 7,443,520 B2
APPLICATION NO. : 10/837962
DATED : October 28, 2008
INVENTOR(S) : Kevin O'Neill It is certified that error appears in the above-identified patent and that said Letters Patent is hereby corrected as shown below:

In column 5, line 42, in Claim 1, after "to" insert -- a --.

In column 5, line 47, in Claim 1, delete "provider:" and insert -- provider; --, therefor.

In column 5, line 51, in Claim 1, delete "identitier," and insert -- identifier, --, therefor.

In column 5, line 60, in Claim 2, delete "devices" and insert -- devices, --, therefor.

In column 6, line 10, in Claim 2, delete "imagine" and insert -- imaging --, therefor.

In column 6, line 53, in Claim 4, after "identifier" insert -- matches print-engine-identifier --.

In column 7, line 18, in Claim 7, after "and" delete "p1".

In column 7, line 64, in Claim 11, after "identifiers," insert -- comparing --.

In column 8, line 16, in Claim 12, delete "appproved" and insert -- approved --, therefor.

In column 8, line 24, in Claim 14, after "of the" insert -- plurality of --.

In column 8, line 30, in Claim 14, after "more" insert -- of the --.

In column 8, line 42, in Claim 14, delete "devices," and insert -- devices --, therefor.

UNITED STATES PATENT AND TRADEMARK OFFICE
CERTIFICATE OF CORRECTION

PATENT NO. : 7,443,520 B2
APPLICATION NO. : 10/837962
DATED : October 28, 2008
INVENTOR(S) : Kevin O'Neill It is certified that error appears in the above-identified patent and that said Letters Patent is hereby corrected as shown below:

In column 8, line 57, in Claim 16, delete "futher comprises;" and insert -- further comprises: --, therefor.

In column 8, line 60, in Claim 16, after "more" insert -- approved --.

Signed and Sealed this

Twenty-fourth Day of March, 2009

JOHN DOLL
*Acting Director of the United States Patent and Trademark Office*